(12) United States Patent
Yamaguchi

(10) Patent No.: US 9,541,645 B2
(45) Date of Patent: Jan. 10, 2017

(54) DETECTING DEVICE, FISH FINDER AND DETECTING METHOD

(71) Applicant: Furuno Electric Co., Ltd., Nishinomiya (JP)

(72) Inventor: Takeharu Yamaguchi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 2 days.

(21) Appl. No.: 14/626,728

(22) Filed: Feb. 19, 2015

(65) Prior Publication Data

US 2015/0234046 A1 Aug. 20, 2015

(30) Foreign Application Priority Data

Feb. 20, 2014 (JP) ................. 2014-030326

(51) Int. Cl.
*G01S 15/96* (2006.01)
*G01S 7/539* (2006.01)
(Continued)

(52) U.S. Cl.
CPC ............ *G01S 15/96* (2013.01); *G01S 7/539* (2013.01); *G01S 7/6272* (2013.01); *G01S 7/6281* (2013.01); *G01S 7/527* (2013.01); *G01S 17/89* (2013.01)

(58) Field of Classification Search
CPC .......... G01S 15/96; G01S 7/539; G01S 7/527; G01S 17/89
See application file for complete search history.

(56) References Cited

U.S. PATENT DOCUMENTS

| 4,439,844 A | 3/1984 | Menin |
| 2006/0018197 A1* | 1/2006 | Burczynski ............. G01S 15/96 367/87 |

(Continued)

FOREIGN PATENT DOCUMENTS

| JP | 2005249398 A | 9/2005 |
| WO | 8505695 A1 | 12/1985 |

OTHER PUBLICATIONS

"Simrad ES70—Split beam fish finder", Simrad, 337675, Rev. A., Aug. 2009, 4 pages.

(Continued)

*Primary Examiner* — Hongmin Fan
(74) *Attorney, Agent, or Firm* — Alleman Hall McCoy Russell & Tuttle LLP

(57) ABSTRACT

A detecting device is provided. The detecting device detects target objects. The detecting device includes a transmitter configured to transmit transmission waves, a receiver configured to generate reception signals from reflection waves of the transmission waves, a target echo signal detecting module configured to detect target echo signals among the reception signals, a size calculating module configured to calculate a size of each the target objects based on the corresponding target echo signal, and a frequency index value distribution calculating module configured to calculate frequency index values for respective size ranges based on the calculated sizes, each frequency index value being an index of the number of the target objects. The frequency index value distribution calculating module has a first updating submodule configured to update the frequency index value for each size range every predetermined period of time.

11 Claims, 16 Drawing Sheets

(51) Int. Cl.
*G01S 7/62* (2006.01)
*G01S 17/89* (2006.01)
*G01S 7/527* (2006.01)

(56) References Cited

U.S. PATENT DOCUMENTS

2008/0080317 A1\* 4/2008 Inouchi ................... G01S 7/539
　　　　　　　　　　　　　　　　　　　　　367/112
2010/0309753 A1\* 12/2010 Misonoo ............... G01S 7/6218
　　　　　　　　　　　　　　　　　　　　　367/107
2012/0140596 A1　　6/2012 Onishi et al.

OTHER PUBLICATIONS

Intellectual Property Office of Great Britain, Search Report Issued in Great Britain Patent Application No. GB1501584.5, Search Conducted Mar. 5, 2015, 2 pages.

\* cited by examiner

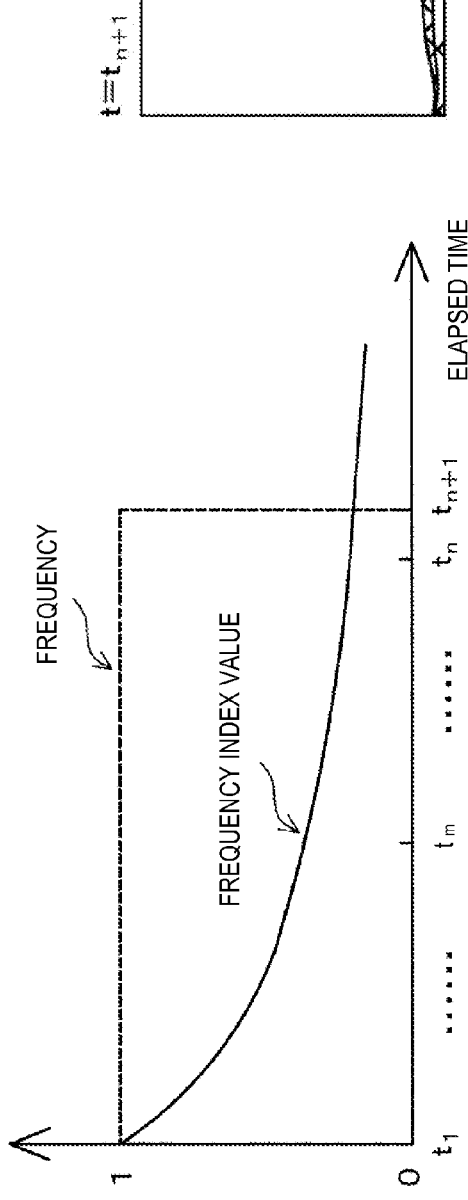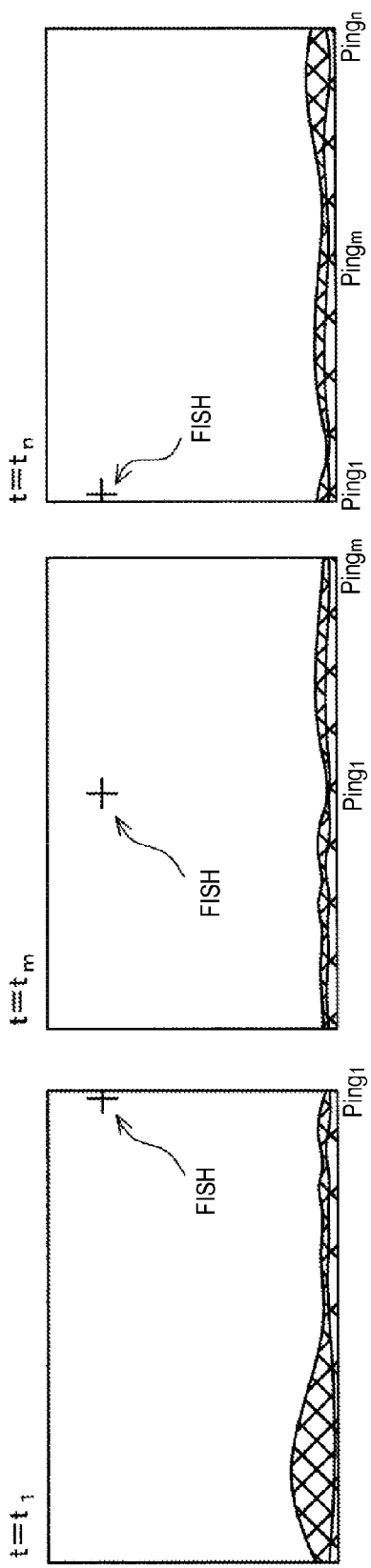
FIG. 5A  FIG. 5B  FIG. 5C  FIG. 5D  FIG. 5E

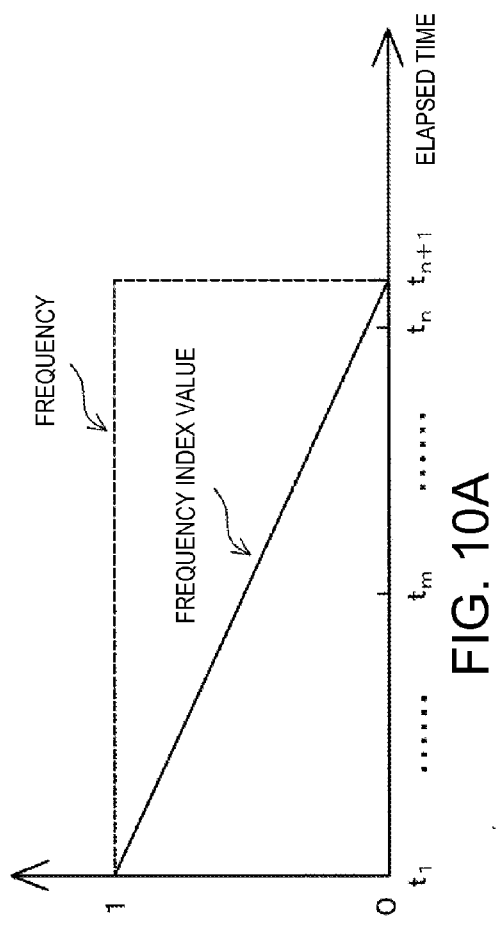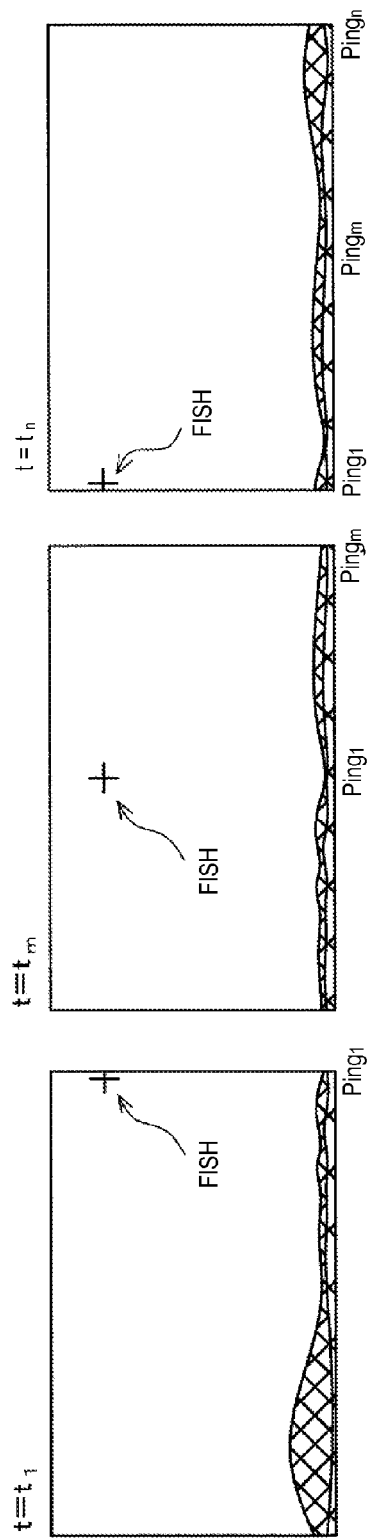

DETECTING DEVICE, FISH FINDER AND DETECTING METHOD

CROSS-REFERENCE TO RELATED APPLICATION(S)

This application claims priority under 35 U.S.C. §119 to Japanese Patent Application No. 2014-030326, which was filed on Feb. 20, 2014, the entire disclosure of which is hereby incorporated by reference.

TECHNICAL FIELD

This disclosure generally relates to a detecting device, which detects a target object, a fish finder, which detects a school of fish as the target object, and a detecting method of detecting the target object.

BACKGROUND OF THE INVENTION

Conventionally, detecting devices for detecting a plurality of target objects, dividing the plurality of detected target objects into a plurality of classes, and deriving the number (frequency) of the plurality of detected target objects per class are known. For example, JP2005-249398A discloses a measuring fish finder that creates a histogram (frequency distribution) by dividing a plurality of single fishes in a predetermined area into classes of body lengths (refer to FIG. 5A and paragraph [0038]). With the measuring fish finder, as described in the paragraph [0038], by selecting an arbitrary area on the display screen, the frequency distribution of the plurality of single fishes in the area can be created.

"Simrad ES70 Split beam fish finder" (produced by SIMRAD) also discloses that the frequency distribution of a plurality of single fishes in an arbitrary area on the display screen can be created by selecting the area, similarly to JP2005-249398A.

Incidentally, it is considered that the frequency distribution displayed on the detecting devices disclosed in JP2005-249398A and "Simrad ES70 Split beam fish finder" is created based on information regarding a plurality of single fishes stored in a memory. The information includes information regarding pings of the respective detected single fishes (positions in the horizontal axis of FIG. 5A in JP2005-249398A), depth positions of the detected single fishes (positions in the vertical axis of FIG. 5A), and echo intensities of the detected single fishes. In other words, with the detecting devices disclosed in JP2005-249398A and "Simrad ES70 Split beam fish finder," lots of information described above must be stored in the memory so as to create the frequency distribution, and thus, a large capacity memory is required.

SUMMARY OF THE INVENTION

The purpose of this disclosure relates to estimating the number of a plurality of detected target objects for each size range without requiring a large capacity memory.

According to one aspect of this disclosure, a detecting device for detecting target objects is provided. The detecting device includes a transmitter configured to transmit a transmission wave at every predetermined timing. The detecting device also includes a receiver configured to generate reception signals from reflection waves of the transmission waves. The detecting device also includes a target echo signal detecting module configured to detect among the reception signals generated by the receiver, target echo signals caused by the target objects. The detecting device also includes a size calculating module configured to calculate a size of each of the target objects based on the corresponding target echo signal. The detecting device also includes a frequency index value distribution calculating module configured to calculate frequency index values for respective size ranges based on the sizes calculated by the size calculating module, each of the frequency index values being an index of the number of the target objects. The frequency index value distribution calculating module has a first updating submodule configured to update the frequency index value for each of the size ranges every predetermined period of time.

The first updating submodule preferably reduces the frequency index value for each size range every predetermined time period.

The first updating submodule preferably multiplies the frequency index value for each size range, by a predetermined value smaller than 1 every predetermined time period.

The first updating submodule preferably decrements the frequency index value for each size range, by a value corresponding to the frequency index value every predetermined time period.

The frequency index value distribution calculating module preferably also has a second updating submodule configured to update, when the target echo signal detecting module detects the target echo signal, the frequency index value of the size range into which the target object corresponding to the target echo signal falls.

When the target echo signal is detected, the second updating submodule preferably increases the frequency index value of the size range into which the target object corresponding to the target echo signal falls.

When a plurality of the target echo signals are detected, the second updating submodule preferably increments the frequency index value of the size ranges into which the target objects corresponding to the plurality of the target echo signals fall, by a value determined based on a number of detected target echo signal.

A period at which the transmission wave is transmitted by the transmitter is preferably the same as a period at which the frequency index value is updated by the first updating submodule.

The transmitter preferably transmits either one of an ultrasonic wave and an electromagnetic wave as the transmission wave at every predetermined timing.

According to another aspect of this disclosure, a fish finder configured to detect single fishes is provided. The fish finder includes the detecting device with any one or more of the configurations described above. The transmitter transmits an ultrasonic wave as the transmission wave at every predetermined timing. The size calculating module is provided as a body length calculating module configured to calculate a body length of the single fishes based on the target echo signals corresponding to the single fishes.

According to further another aspect of this disclosure, a method of detecting target objects is provided. The method includes transmitting a transmission wave at every predetermined timing. The method also includes generating reception signals from reflection waves of the transmission waves. The method also includes detecting among the generated reception signals target echo signals caused by the target objects. The method also includes calculating a size of each of the target objects based on the corresponding target echo signal. The method also includes calculating frequency index values for respective size ranges based on the calculated sizes, each of the frequency index values being an index of the number of the target objects. Calculating the frequency index values for the respective size ranges includes updating the frequency index value for each of the size ranges every predetermined period of time.

According to this disclosure, the number of the plurality of detected target objects for each size range can be estimated without requiring a large capacity memory.

BRIEF DESCRIPTION OF THE DRAWINGS

The present disclosure is illustrated by way of example and not by way of limitation in the figures of the accompanying drawings, in which the like reference numerals indicate like elements and in which:

FIG. 5A is a chart for describing a change of the number-of-fish index value over time, and FIGS. 5B to 5E are views illustrating a display screen in correspondence with frequency index values (or frequencies) at respective timings;

FIG. 10A is a chart for describing a change of the number-of-fish index value over time, and FIGS. 10B to 10E are views illustrating the display screen in correspondence with frequency index values (or frequencies) at respective timings;

DETAILED DESCRIPTION

Figure 1:
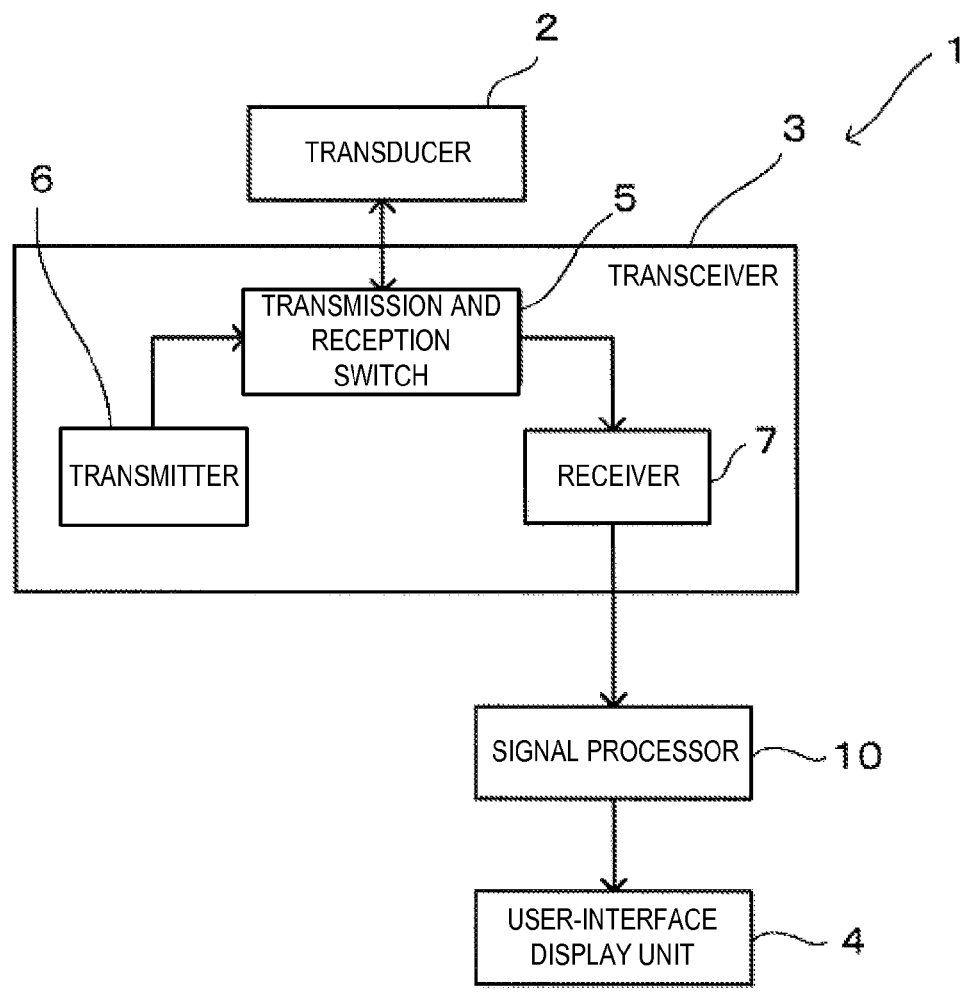
FIG. 1 is a block diagram illustrating a configuration of a fish finder according to one embodiment of this disclosure.

Hereinafter, one embodiment of a fish finder 1 as a detecting device according to this disclosure is described with reference to the drawings. FIG. 1 is a block diagram illustrating a configuration of the fish finder 1 of this embodiment of this disclosure.

Overall Configuration

As illustrated in FIG. 1, the fish finder 1 includes a transducer 2, a transceiver 3, a signal processor 10, and a user-interface display unit 4 (display unit). The fish finder 1 is installed in a ship (e.g., fishing boat) and used to detect single fishes (target objects).

The transducer 2 converts an electric signal into an ultrasonic wave, transmits the ultrasonic wave underwater at every predetermined timing (i.e., at a predetermined cycle), receives ultrasonic waves, and converts the received ultrasonic waves into electric signals.

The transceiver 3 includes a transmission and reception switch 5, a transmitter 6, and a receiver 7. In transmission, the transmission and reception switch 5 switches the connection in the transceiver 3 such that each electric signal is transmitted from the transmitter 6 to the transducer 2. Moreover in reception, the transmission and reception switch 5 switches the connection in the transceiver 3 such that each electric signal converted from the ultrasonic wave by the transducer 2 is transmitted from the transducer 2 to the receiver 7.

The transmitter 6 outputs the electric signal generated based on a condition set by the user-interface display unit 4, to the transducer 2 via the transmission and reception switch 5.

The receiver 7 amplifies the signal received by the transducer 2 and A/D converts it into a digital signal. The receiver 7 outputs the reception signal converted into the digital signal, to the signal processor 10.

The signal processor 10 processes the reception signal outputted from the receiver 7 and performs processing for generating an image signal of an object.

Moreover, the signal processor 10 creates a chart of number-of-fish index values (frequency index values) assigned to various fish body lengths (sizes). The number-of-fish index value is an index indicating the number of single fishes existing in a predetermined area (target area) underwater below the ship (movable body) in which the fish finder 1 is installed. This chart is similar to a frequency distribution chart (hereinafter, may be referred to as the number-of-fish index value distribution chart D). The configuration of the signal processor 10 is described later in detail.

Figure 2:
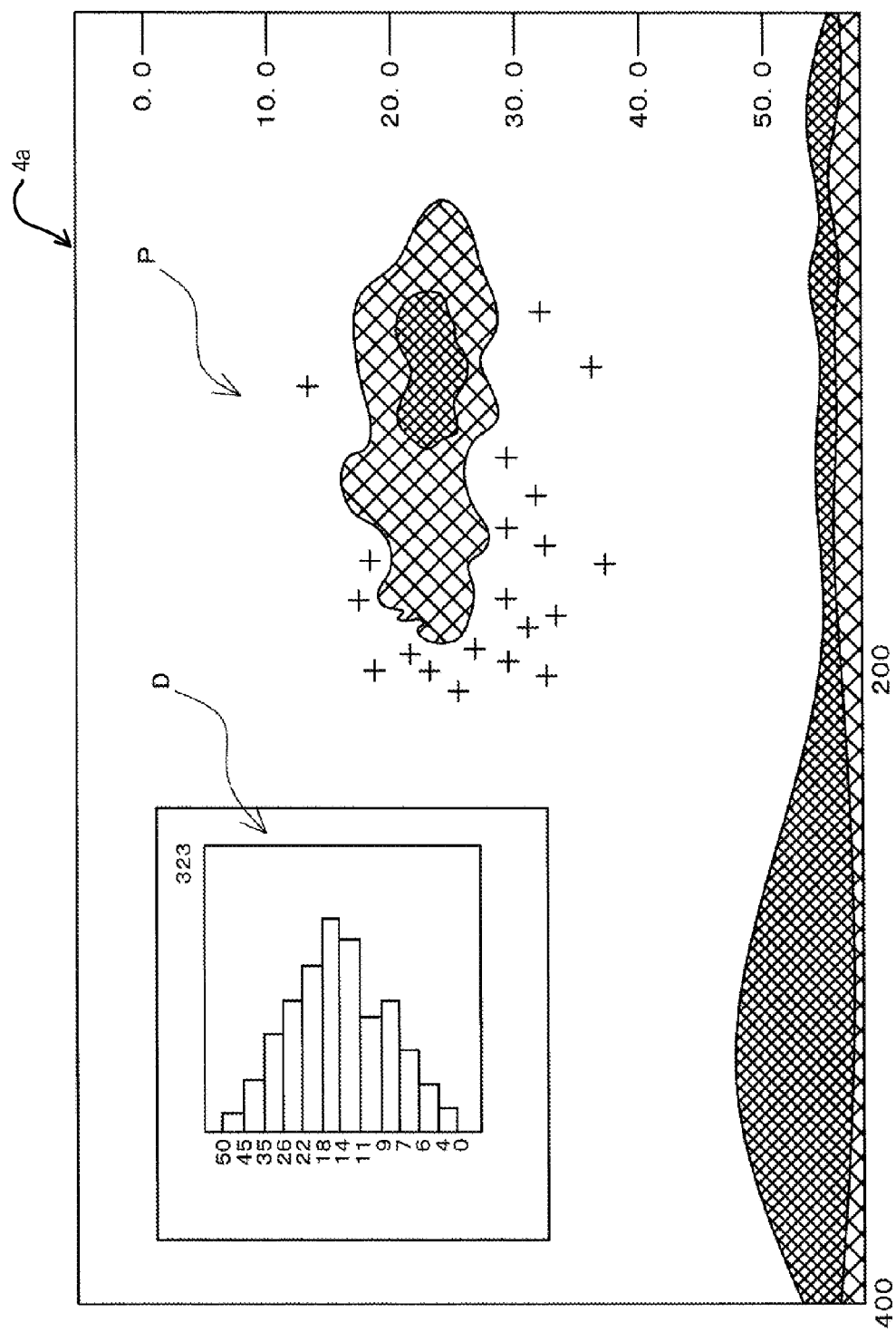
FIG. 2 is a view schematically illustrating one example of a display screen of a user-interface display unit of the fish finder in FIG. 1.

FIG. 2 is a view schematically illustrating one example of a display screen 4a of the user-interface display unit 4 of the fish finder 1 in FIG. 1. As illustrated in FIG. 2, the user-interface display unit 4 displays an image P according to the image signal outputted from the signal processor 10 on the display screen 4a. An operator can estimate a state of an area underwater below the ship (e.g., whether a single fish and/or a school of fish exist therein) by looking at the image P on the display screen 4a. Moreover, the user-interface display unit 4 has an input unit with various input keys, etc. . . . so that various settings or various parameters required for the transmission and reception of the ultrasonic wave, the signal processing or the image display can be inputted therethrough.

Further, as illustrated in FIG. 2, the number-of-fish index value distribution chart D created by the signal processor 10 is displayed on the display screen 4a of the user-interface display unit 4.

Figure 3:
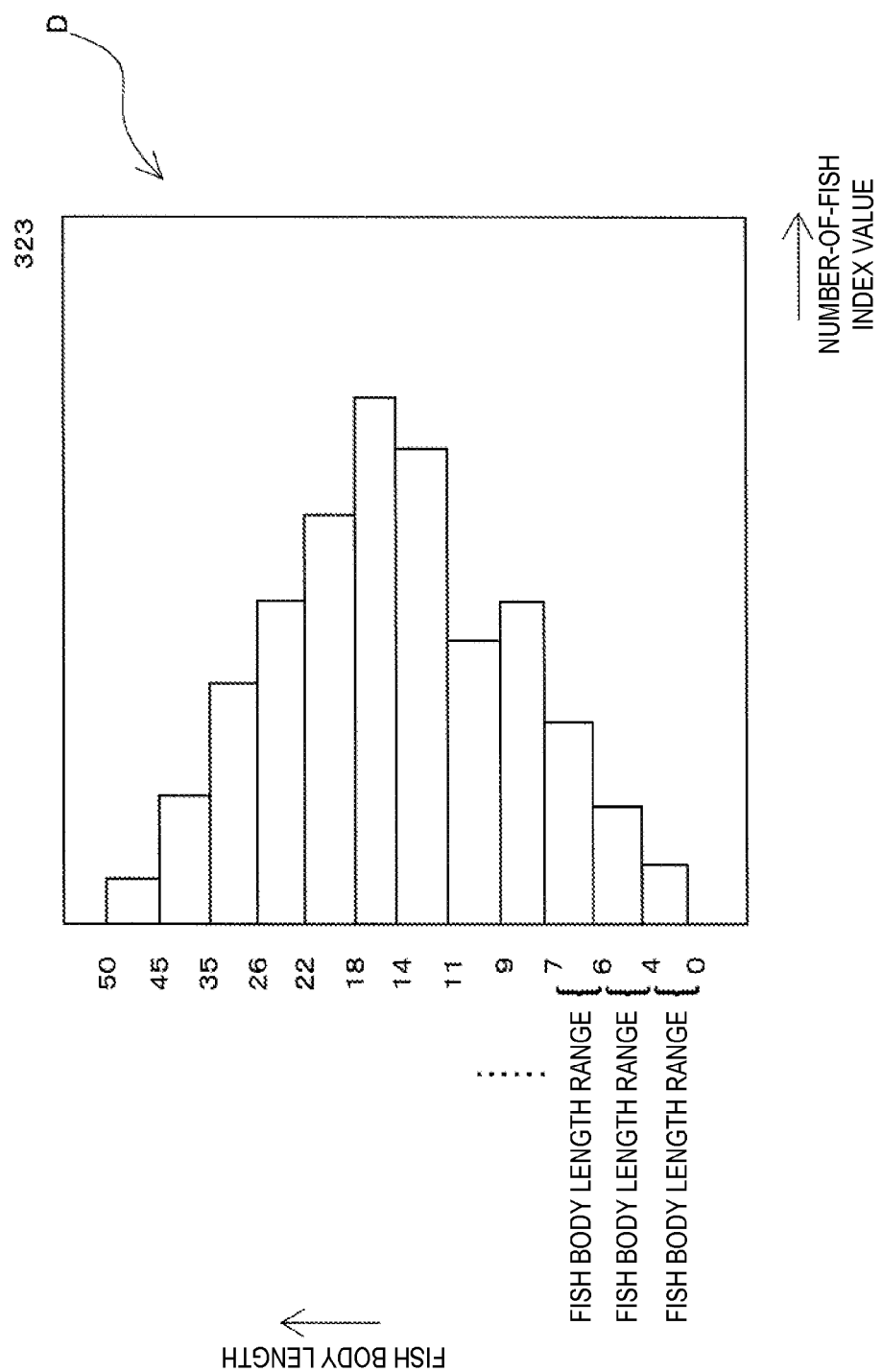
FIG. 3 is a chart for describing one example of a number-of-fish index value distribution chart displayed on the user-interface display unit, illustrating a number-of-fish index value distribution chart in FIG. 2 in an enlarged manner.

FIG. 3 is a chart for describing one example of the number-of-fish index value distribution chart D displayed on the user-interface display unit 4, illustrating the number-of-fish index value distribution chart D in FIG. 2 in an enlarged manner. In the example of FIG. 3, the vertical axis of the number-of-fish index value distribution chart D indicates the body lengths of the detected single fishes and is assigned to respective fish body length ranges (in FIG. 3, a section for below 4 cm, a section for 4 to 6 cm, a section for 6 to 7 cm, . . . ). Moreover, the horizontal axis of the number-of-fish index value distribution chart D indicates the number-of-fish index values, each indicating the number of single fishes within one of the fish body length ranges. Furthermore, the total number of single fishes displayed on the display screen 4a (in FIGS. 2 and 3, 323 single fishes) is displayed in the upper right of the number-of-fish index value distribution chart D. Thus, the operator can estimate the total number of the single fishes within the display screen 4a and the number of single fishes in each fish body length range. Note that, in the examples of FIGS. 2 and 3, the width of each fish body length range is different; however, without limitation to this, it may be the same.

Configuration of Signal Processor

Figure 4:
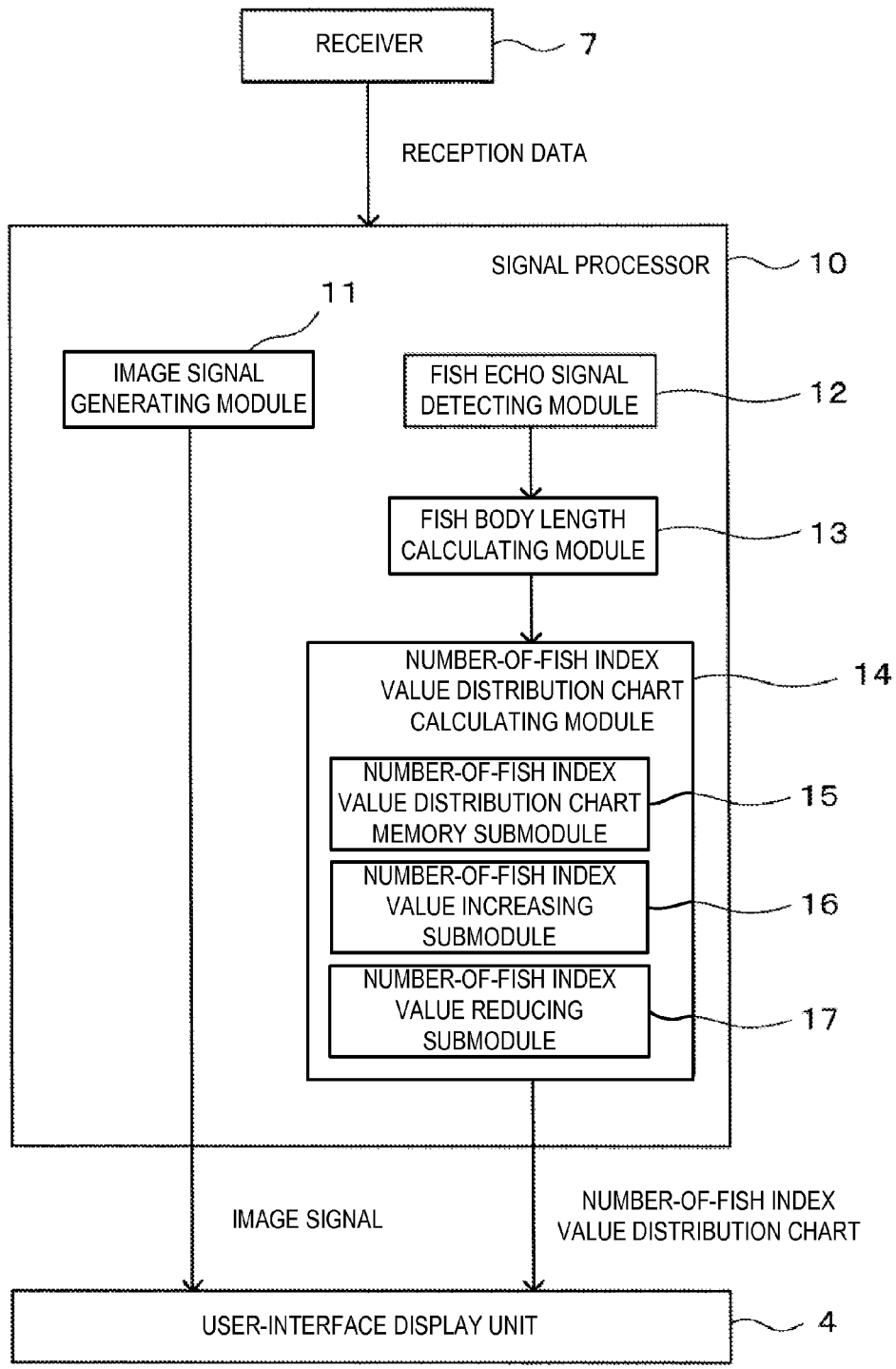
FIG. 4 is a block diagram illustrating a configuration of a signal processor of the fish finder in FIG. 1.

FIG. 4 is a block diagram illustrating the configuration of the signal processor 10 of the fish finder 1 in FIG. 1. As illustrated in FIG. 4, the signal processor 10 includes an image signal generating module 11, a fish echo signal detecting module 12 (target echo signal detecting module), a fish body length calculating module 13 (size calculating module), and a number-of-fish index value distribution chart calculating module 14 (frequency index value distribution calculating module).

The image signal generating module 11 processes the reception signals outputted from the receiver 7 and generates the image signals of the objects. The image signals generated by the image signal generating module 11 are transmitted to the user-interface display unit 4, and the user-interface display unit 4 displays echo images underwater based on the image signals (see FIG. 2).

The fish echo signal detecting module 12 detects with a general method fish echo signals (target echo signals) which are the echo signals caused by single fishes, among the reception signals outputted from the receiver 7. Specifically, for example as disclosed in U.S. Pat. No. 7,663,974B2, the fish echo signal detecting module 12 detects the fish echo signals based on intensities of a reflection wave of a pulse wave at high frequency and a reflection wave of a pulse wave at low frequency transmitted from the transducer 2.

The fish body length calculating module 13 calculates with a general method the body length of the single fish concerned, based on the corresponding fish echo signal detected by the fish echo signal detecting module 12. Specifically, for example as disclosed in U.S. Pat. No. 7,663,974B2, the fish body length calculating module 13 calculates the body length of the single fish based on echo intensity of the fish echo signal.

The number-of-fish index value distribution chart calculating module 14 calculates the number-of-fish index value distribution chart. As illustrated in FIG. 4, the number-of-fish index value distribution chart calculating module 14 has a number-of-fish index value distribution chart memory submodule 15, a number-of-fish index value increasing submodule 16, and a number-of-fish index value reducing submodule 17.

The number-of-fish index value distribution chart memory submodule 15 stores the number-of-fish index value distribution chart. The number-of-fish index value distribution chart memory submodule 15, in its initial state, stores a number-of-fish index value distribution chart in which the number-of-fish index values of the respective fish body length ranges are zero. Further, the number-of-fish index value distribution chart is updated by the number-of-fish index value increasing submodule 16 and the number-of-fish index value reducing submodule 17 as needed.

The number-of-fish index value increasing submodule 16 is provided as a second updating submodule configured to update, when the fish echo signal detecting module 12 detects the single fish, the number-of-fish index value of the fish body length range into which the single fish concerned falls. After the single fish is detected by the fish echo signal detecting module 12, the number-of-fish index value increasing submodule 16 increases the number-of-fish index value of the fish body length range into which the single fish concerned falls.

The number-of-fish index value increasing submodule 16 stores a count value to be added to the number-of-fish index value when one single fish is detected. Further, the number-of-fish index value increasing submodule 16 multiplies the count value by a number according to the number of detected single fishes and increments the number-of-fish index value by the multiplied count value. Specifically, for example in a case where 1 (one) is stored as the count value, the number-of-fish index value is incremented by 1 when one single fish is detected, and the number-of-fish index value is incremented by 2 when two single fishes are detected. Note that, the operator can change the count value by suitably controlling the user-interface display unit 4. Specifically, if the operator changes the count value to 2 (two), the number-of-fish index value is incremented by 2 when one single fish is detected, and the number-of-fish index value is incremented by 4 when two single fishes are detected.

The number-of-fish index value reducing submodule 17 is provided as a first updating submodule configured to update the number-of-fish index values of the respective fish body length ranges every predetermined period of time. The number-of-fish index value reducing submodule 17 reduces the number-of-fish index values of the respective fish body length ranges every predetermined period of time. In this embodiment, the number-of-fish index value reducing submodule 17 reduces the number-of-fish index value at the same period (cycle) as the period (cycle) that the transducer 2 transmits the ultrasonic wave.

The number-of-fish index value reducing submodule 17 stores a value (multiplication value), which is smaller than 1 (one), to be multiplied by the number-of-fish index value of each fish body length range every predetermined period of time. 0.99 is an example of multiplication value. Note that, the operator can change the multiplication value by suitably controlling the user-interface display unit 4. Specifically, the operator can change the multiplication value to 0.98, 0.97 or the like by controlling the user-interface display unit 4.

FIG. 5A is a chart for describing a change of the number-of-fish index value over time in a case where one single fish is detected, and FIGS. 5B to 5E are views illustrating the display screen in correspondence with frequency index values (or frequencies) at respective timings in the case where the single fish is detected. FIGS. 5A to 5E illustrate an example in which one single fish is detected at a timing $t=t_1$, the image of the single fish gradually shifts leftward on the display screen with time, and the image of the single fish goes out of the display screen at $t=t_{n+1}$.

With a conventional fish finder, by monitoring the detected single fish as indicated by the dashed line in FIG. 5A, while the single fish is displayed on the display screen (while $t=t_1$ to $t_n$) the frequency is 1 and then the frequency becomes zero when the image of the single fish goes out of the display screen (when $t=t_{n+1}$).

On the other hand, with the fish finder 1 of this embodiment, the number-of-fish index value reducing submodule 17 multiplies the number-of-fish index value by the multiplication value (smaller than 1) every predetermined period of time (specifically, in every ping) to update the number-of-fish index value. In other words, in the number-of-fish index value distribution chart calculating module 14 of this embodiment, the monitoring of the single fish displayed on the display screen is not performed and the number-of-fish index value is gradually decremented every predetermined time period.

Operation of Sonar

Figure 6:
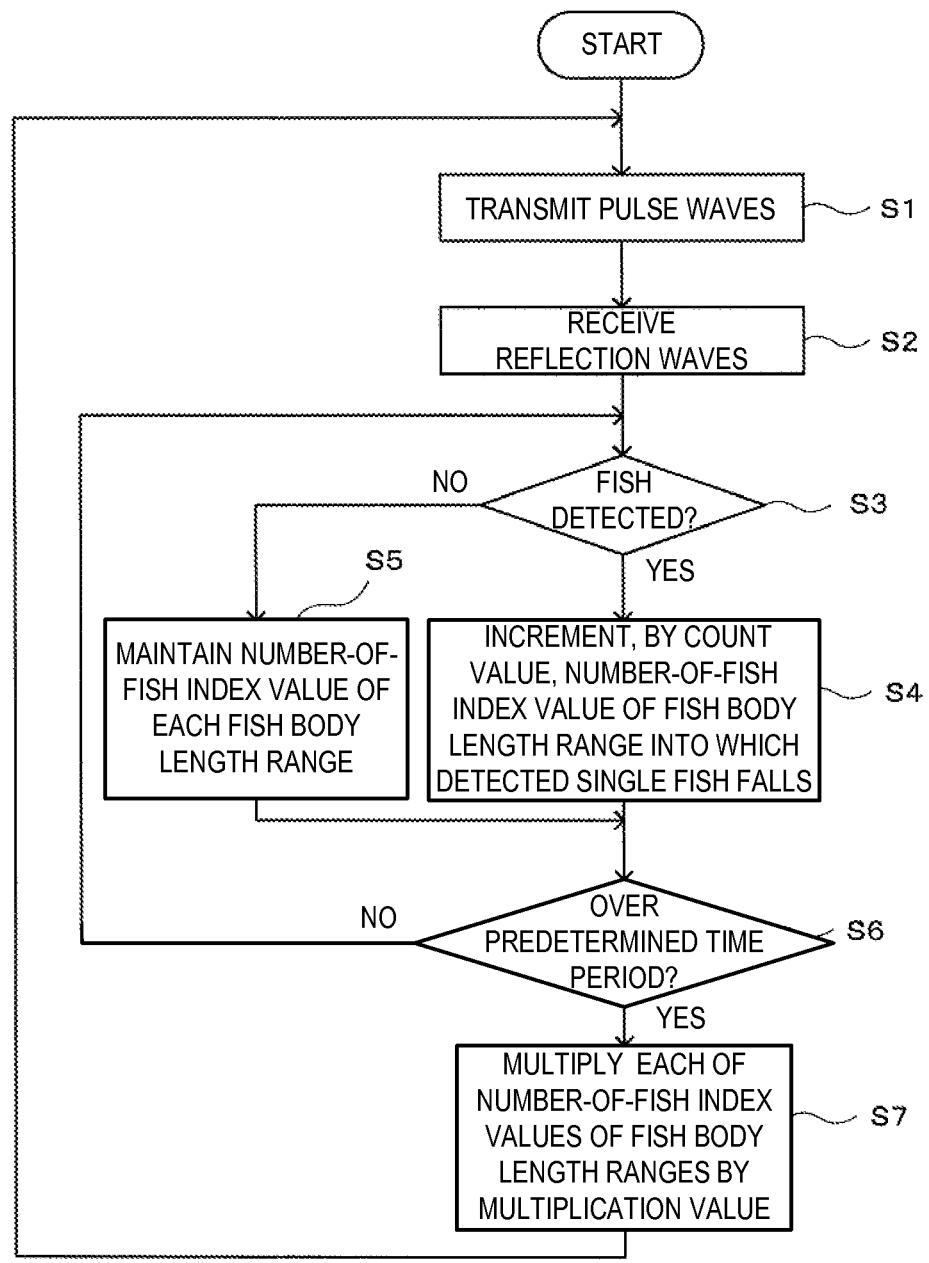
FIG. 6 is a flowchart for describing an operation of the fish finder in FIG. 1.

FIG. 6 is a flowchart for describing the operation of the fish finder 1 of this embodiment. Hereinafter, the operation of the fish finder 1 is described with reference to FIG. 6.

First, at S1, the transmitter 6 transmits the pulse waves underwater via the transducer 2. Then, the reflection waves of the transmitted pulse waves are received by the receiver 7 via the transducer 2 (S2), and the reception signals are generated by the receiver 7.

Next, at S3, if the single fish is detected (i.e., if the fish echo signal detecting module 12 detects the fish echo signal which is the echo signal estimated to be caused by the single fish), the flow of the operation proceeds to the positive side of S3 (S3: YES). Then, at S4, the number-of-fish index value increasing submodule 16, upon the calculation of the body length of the single fish by the fish body length calculating module 13, increments by the count value the number-of-fish index value of the fish body length range into which the body length of the single fish falls, in the number-of-fish index value distribution chart stored in the number-of-fish index value distribution chart memory submodule 15. On the other hand, if the single fish is not detected (S3: NO), the number-of-fish index value distribution chart stored in the number-of-fish index value distribution chart memory submodule 15 is maintained as it is (S5).

Next, at S6, it is determined whether the elapsed time from the start of the current operation flow is over a predetermined period of time. If the elapsed time is not over the predetermined time period (S6: NO), the flow returns back to S3 where the fish detection is performed again, whereas if the elapsed time is over the predetermined time period (S6: YES), at S7, each of the number-of-fish index values of the fish body length ranges is multiplied by the multiplication value (0.99 in this embodiment). Then, the flow returns back to S1 where the pulse wave is transmitted again, and the reception of the reflection waves of the pulse waves (S2) and the detection of the fish echo signals among the reception signals caused by the reflection waves (S3) are performed again.

Then, by repeating the above procedure, the number-of-fish index value distribution chart of the single fishes within the display screen 4a is updated as needed.

With the fish finder 1 of this embodiment, as it can be understood from the configuration and operation of the fish finder 1 described above, the number-of-fish index value distribution chart is calculated without performing the monitoring of each single fish displayed on the display screen. Thus, the required capacity of the memory used to create the number-of-fish index value distribution chart is smaller than that of a memory used to create a conventional frequency distribution chart. Therefore, according to the fish finder 1, the number of single fishes existing in a predetermined area can be estimated for each body length range without requiring a memory with large capacity.

Verification of Validity of Number-of-Fish Index Value Distribution Chart

To accurately calculate the number of single fishes existing in the predetermined area for each body length range, it is preferred to calculate the frequency distribution chart by monitoring each single fish existing in the predetermined area. However, with this method, a memory with large capacity is required to monitor each single fish as described above.

On the other hand, the number-of-fish index value distribution chart described above is designed by the present inventor for the purpose of reducing the capacity of the memory of the fish finder 1, and the number-of-fish index value distribution chart is not completely the same as the frequency distribution chart formed by accurately calculating the number of single fishes. Hereinafter, the validity of the number-of-fish index value distribution chart described above is tested by using simulation results.

Figure 7A:
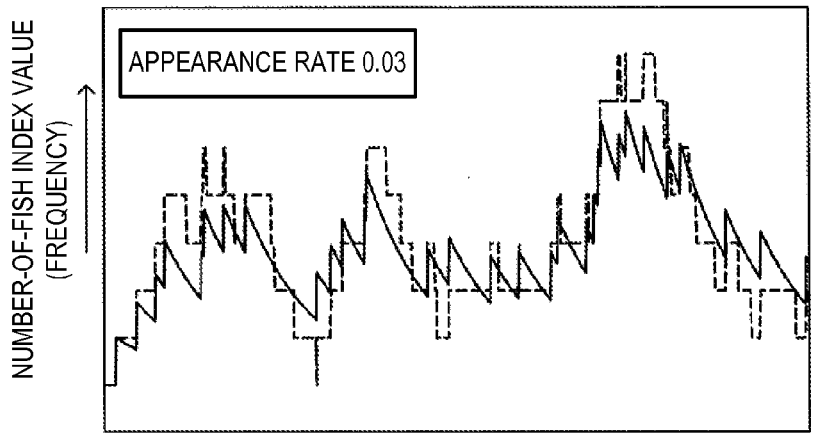
FIGS. 7A to 7C are simulation charts illustrating, with different appearance rates of single fish, a change of the number-of-fish index value over time in the number-of-fish index value distribution chart created by the fish finder in FIG. 1 together with a change of a frequency (number of single fishes) over time in a frequency distribution chart created by a conventional fish finder.
Figure 7B:
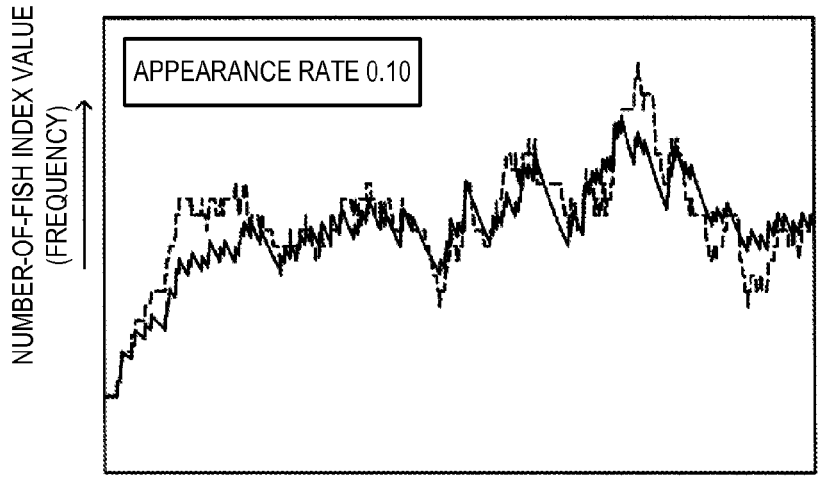
Figure 7C:
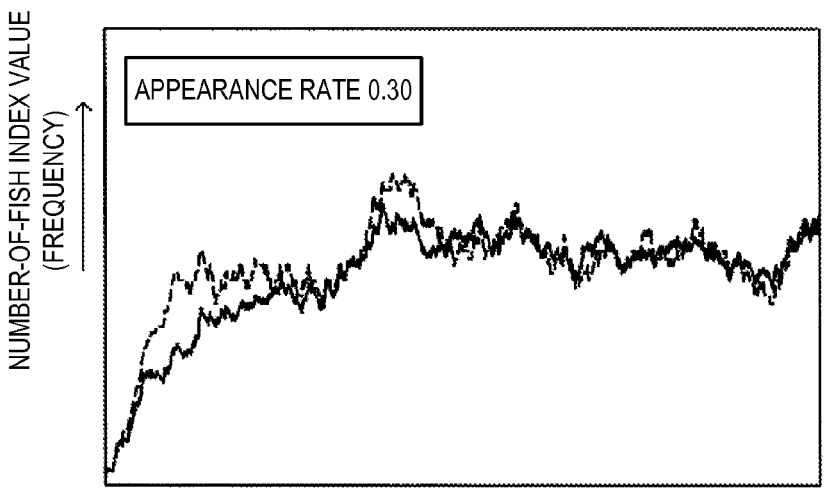

FIGS. 7A to 7C are simulation charts illustrating a change of the number-of-fish index value over time in the number-of-fish index value distribution chart created by the fish finder 1 together with a change of a frequency (number of single fishes) over time in the frequency distribution chart created by a conventional fish finder. Specifically, FIG. 7A is the chart where the appearance rate of single fish is 0.03, FIG. 7B is the chart where the appearance rate of single fish is 0.10, and FIG. 7C is the chart where the appearance rate of single fish is 0.30. In each chart of FIGS. 7A to 7C, the change over time in the number-of-fish index value distribution chart is indicated by the solid line and the change over time in the frequency distribution chart is indicated by the dashed line. Note that, the appearance rate of single fish is a probability at each ping that a single fish is detected. Moreover, in each chart of FIGS. 7A to 7C, a simulation is performed with the count value as 1 and the multiplication value as 0.99.

As illustrated in FIGS. 7A to 7C, the change of the number-of-fish index value over time in the number-of-fish index value distribution chart is substantially matching the change of the frequency over time in the frequency distribution chart even if the appearance rate of single fish is changed. Thus, it can be understood that the number-of-fish index value distribution chart is an applicable chart which is similar to the frequency distribution chart.

Figure 8A:
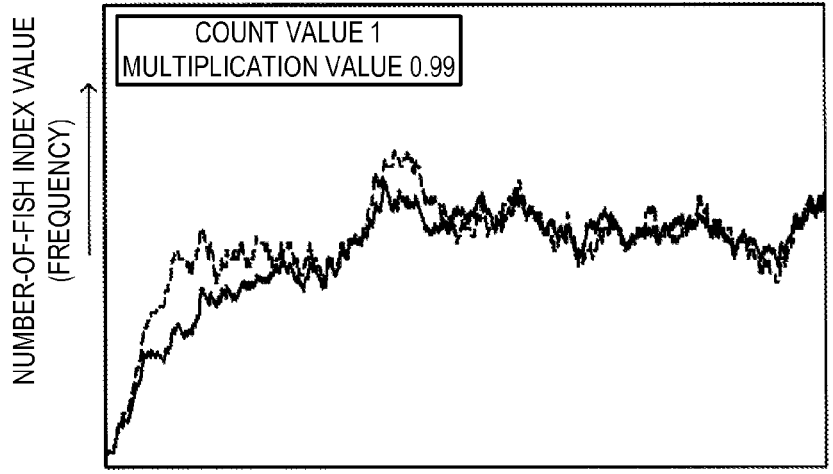
FIGS. 8A to 8C are simulation charts illustrating, with different count values and multiplication values, the change of the number-of-fish index value over time in the number-of-fish index value distribution chart created by the fish finder in FIG. 1 together with the change of the frequency (number of single fishes) over time in the frequency distribution chart created by the conventional fish finder.
Figure 8B:
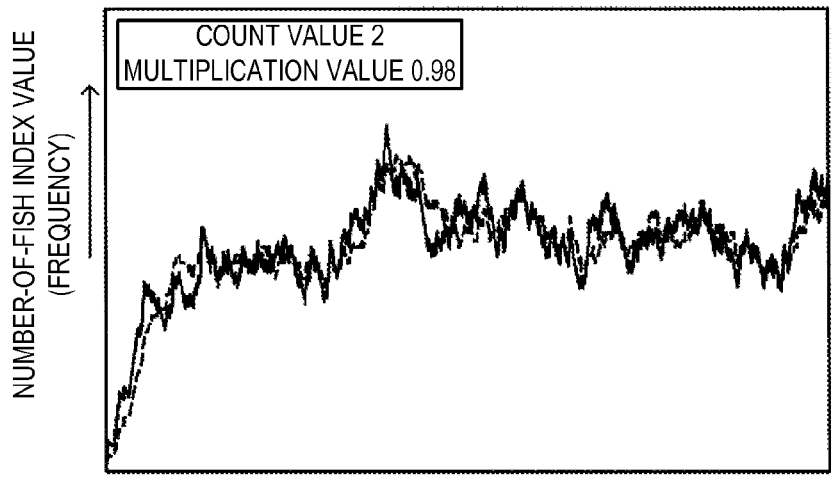
Figure 8C:
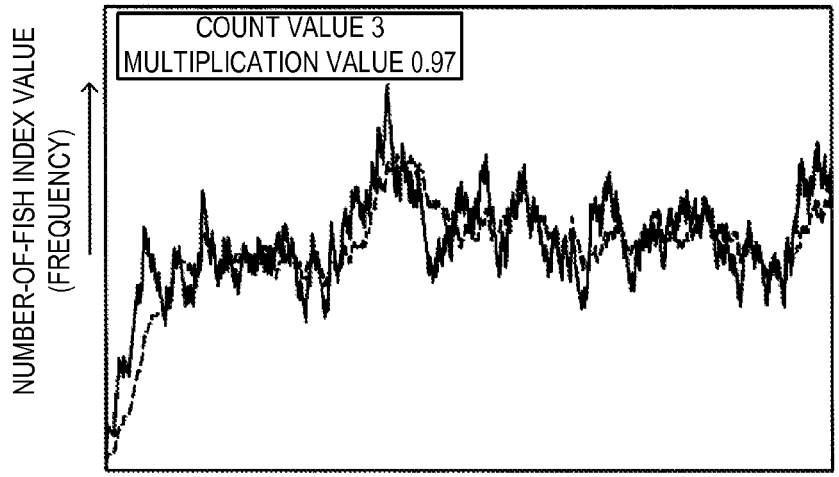

FIGS. 8A to 8C are simulation charts illustrating the change of the number-of-fish index value over time in the number-of-fish index value distribution chart created by the fish finder 1 together with the change of the frequency (number of single fishes) over time in the frequency distribution chart created by the conventional fish finder. Specifically, FIG. 8A is the chart where the count value is 1 and the multiplication value is 0.99, FIG. 8B is the chart where the count value is 2 and the multiplication value is 0.98, and FIG. 8C is the chart where the count value is 3 and the multiplication value is 0.97. Also in FIGS. 8A to 8C, similar to FIGS. 7A to 7C, the change over time in the number-of-fish index value distribution chart is indicated by the solid line and the change over time in the frequency distribution chart is indicated by the dashed line. Note that, in each chart of FIGS. 8A to 8C, a simulation is performed with the appearance rate of single fish as 0.30.

As illustrated in FIGS. 8A to 8C, the change of the number-of-fish index value over time in the number-of-fish index value distribution chart is substantially matching the change of the frequency over time in the frequency distribution chart even if the count value and the multiplication values are changed. Moreover, according to FIGS. 8A to 8C, when the count value is small and the multiplication value is large (see FIG. 8A), although an excessive change of the number-of-fish index value over time can be suppressed, the number-of-fish index value immediately after the number-of-fish index value distribution chart is created tends to be excessively underestimated compared to the actual number of single fishes. On the other hand, when the count value is large and the multiplication value is small (see FIG. 8C), although the tendency of excessive underestimation of the number-of-fish index value immediately after the number-of-fish index value distribution chart is created disappears, the number-of-fish index value excessively changes with time. Based on the simulation results, it can be confirmed that a count value and a multiplication value are preferably set suitably according to the conditions such as the appearance rate of single fish.

Effects

As described above, with the fish finder 1 of this embodiment, the distribution chart D for the number-of-fish index value which is a value close to the number of single fishes within each fish body length range is calculated. Further, as described above, with the fish finder 1, the number-of-fish index value distribution chart D updated every predetermined time period is created without storing information of each single fish (e.g., position and echo intensity of each single fish).

Therefore, with the fish finder 1, the numbers of the plurality of detected single fishes in the respective body length ranges can be estimated without requiring a memory with large capacity.

Further, with the fish finder 1, the number-of-fish index value reducing submodule 17 reduces each of the number-of-fish index values of the respective fish body length ranges every predetermined time period. By doing so, as described in the simulation results above, the distribution chart D similar to a frequency distribution with actual frequency of single fishes can be calculated.

Moreover, with the fish finder 1, the number-of-fish index value reducing submodule 17 multiplies each of the number-of-fish index values of the respective fish body length ranges by the predetermined value smaller than 1 every predetermined time period. Thus, the number-of-fish index value distribution chart D can be updated comparatively easily.

Moreover, with the fish finder 1, when the single fish is detected, the number-of-fish index value increasing submodule 16 updates the number-of-fish index value of the fish body length range into which the single fish falls. By doing so, as described in the simulation results above, the distribution chart D similar to a frequency distribution with actual frequency of single fishes can be calculated.

Moreover, with the fish finder 1, when the single fish is detected, the number-of-fish index value increasing submodule 16 increases the number-of-fish index value of the fish body length into which the single fish falls. Thus, a more suitable number-of-fish index value distribution chart D can be calculated.

Moreover, with the fish finder 1, when the single fish is detected, the number-of-fish index value increasing submodule 16 increments the number-of-fish index value of the fish body length into which the single fish falls, by the value corresponding to the number of detected single fishes. Thus, the suitable number-of-fish index value distribution chart D can be created comparatively easily.

Furthermore, with the fish finder 1, the number-of-fish index value reducing submodule 17 serving as the first updating submodule reduces the number-of-fish index value at the same period (cycle) as the period (cycle) that the transducer 2 transmits the ultrasonic wave. With the fish finder 1, a single transmission of the transmission wave corresponds to a single ping on the display screen. Further, with the fish finder 1 of this embodiment, the number-of-fish index value is reduced at every ping. Thus, the number-of-fish value can be reduced at a suitable timing.

Moreover, in this embodiment, the detecting device according to this disclosure is applied to a fish finder. Thus, the distribution of the detected single fishes in each body length range can be estimated.

Moreover, with the fish finder 1, a more suitable number-of-fish index value distribution chart D can be created through the control of the user-interface display unit 4 by the operator to suitably set the count value and the multiplication value, according to the condition such as the appearance rate of single fish.

Modifications

Although the embodiment of this disclosure is described above, this disclosure is not limited to this, and various changes may be applied without deviating from the scope of this disclosure.

Figure 9:
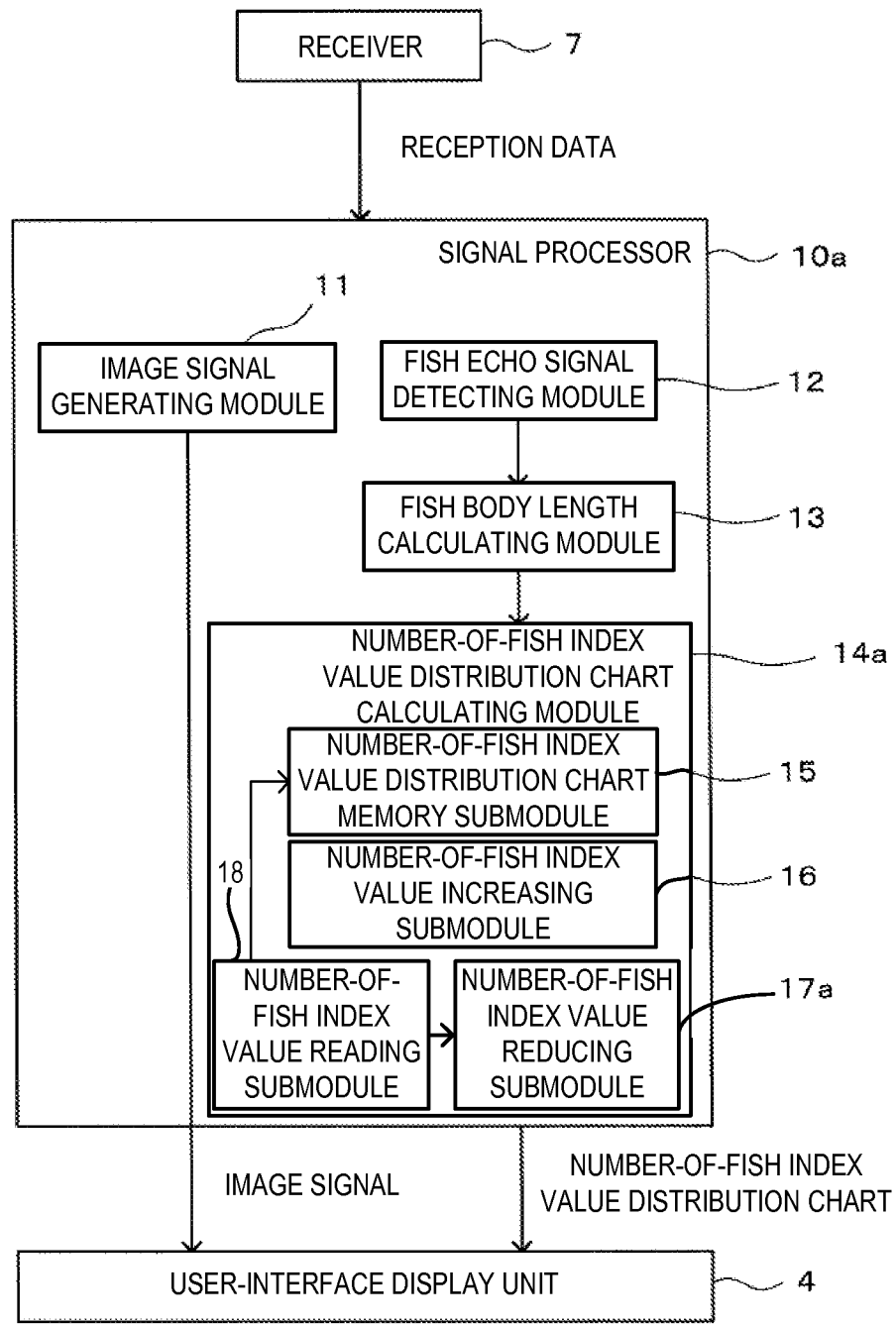
FIG. 9 is a block diagram illustrating a configuration of a signal processor of the fish finder according to a first modification.

FIG. 9 is a block diagram illustrating a configuration of a signal processor 10a of the fish finder according to a first modification. The signal processor 10a of the first modification has a number-of-fish index value distribution chart calculating submodule with a different configuration from that of the signal processor 10 of the above embodiment. A number-of-fish index value distribution chart calculating module 14a of the first modification includes a number-of-fish index value distribution chart memory submodule 15, a number-of-fish index value increasing submodule 16, a number-of-fish index value reducing submodule 17a, and a number-of-fish index value reading submodule 18.

The number-of-fish index value distribution chart memory submodule 15 and the number-of-fish index value increasing submodule 16 operate similarly to the above embodiment. Specifically, the number-of-fish index value distribution chart memory submodule 15, in its initial state, stores a number-of-fish index value distribution chart in which the number-of-fish index values of the respective fish body length ranges are zero. Further, the number-of-fish index value distribution chart is updated by the number-of-fish index value increasing submodule 16 and the number-of-fish index value reducing submodule 17a as needed. Moreover, after the fish echo signal detecting module 12 detects the single fish(es), the number-of-fish index value increasing submodule 16, upon the calculation of the body length of the single fish by the fish body length calculating module 13, increments the number-of-fish index value of the fish body length range into which the body length of the detected single fish(es) falls, by a value corresponding to the number of detected single fish(es).

Every predetermined period of time, the number-of-fish index value reading submodule 18 reads the number-of-fish index value for each fish body length range in the number-of-fish index value distribution chart stored in the number-of-fish index value distribution chart memory submodule 15. The number-of-fish index value of each fish body length range read by the number-of-fish index value reading submodule 18 is informed to the number-of-fish index value reducing submodule 17a every time the index value is read.

The number-of-fish index value reducing submodule 17a decrements the number-of-fish index value of each fish body length range by a value corresponding to the number-of-fish index value read by the number-of-fish index value reading submodule 18. Specifically, the number-of-fish index value reducing submodule 17a stores a predetermined decrement value. For example, the decrement value is set according to a total number of pings displayed on the display screen 4a. Further, when the number-of-fish index value of one of the fish body length ranges is 0 or larger but smaller than 1, the number-of-fish index value reducing submodule 17a decrements the number-of-fish index value by the stored decrement value. Moreover, when the number-of-fish index value of one of the fish body length ranges is 1 or larger but smaller than 2, the number-of-fish index value reducing submodule 17a decrements the number-of-fish index value by double the decrement value, and when the number-of-fish index value of one of the fish body length ranges is 2 or larger but smaller than 3, the number-of-fish index value reducing submodule 17a decrements the number-of-fish index value by triple the decrement value. The decrement value increases similarly to above as the number-of-fish index value becomes larger than the above values. Note that, the operator can change the decrement value by suitably controlling the user-interface display unit 4.

FIG. 10A is a chart for describing a change of the number-of-fish index value over time in a case where one single fish is detected, and FIGS. 10B to 10E are views illustrating the display screen in correspondence with frequency index values (or frequencies) at respective timings in the case where the single fish is detected. FIGS. 10A to 10E, similar to FIGS. 5A to 5E, illustrate an example in which one single fish is detected at the timing $t=t_1$, and the image of the single fish goes out of the display screen at $t=t_{n+1}$.

As illustrated in FIGS. 10A to 10E, with the number-of-fish index value distribution chart calculating module 14a of the fish finder of this first modification, the number-of-fish index value reducing submodule 17a decrements the number-of-fish index value by the decrement value (1/100 in the first modification) every predetermined time period (specifically, at every ping) to update the number-of-fish index value. In other words, also with the number-of-fish index value distribution chart calculating module 14a of the first modification, similar to the above embodiment, the monitoring of the single fish displayed on the display screen is not performed and the number-of-fish index value is gradually decremented every predetermined time period.

Figure 11F:
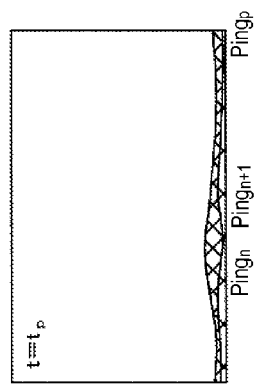
FIGS. 11B to 11F are views illustrating the display screen in correspondence with frequency index values (or frequencies) at respective timings.
Figure 11E:
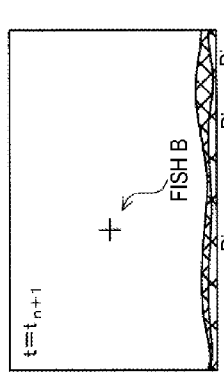
Figure 11D:
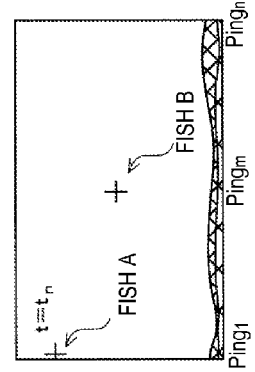
Figure 11A:
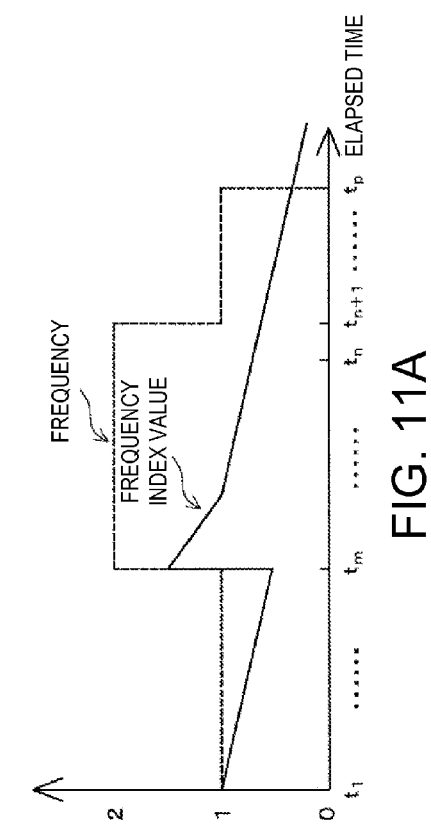
FIG. 11A is a chart for describing another change of the number-of-fish index value over time.
Figure 11C:
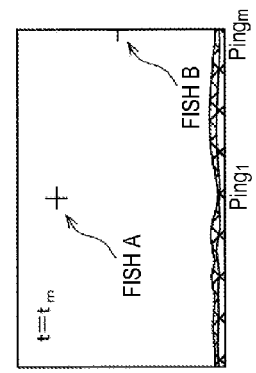
Figure 11B:
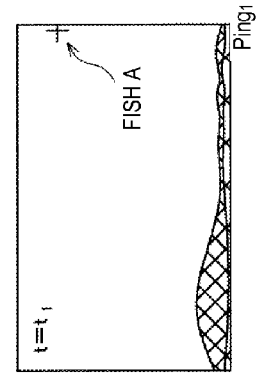

FIG. 11A is a chart for describing a change of the number-of-fish index value over time in a case where two single fishes A and B are detected at different timings, and FIGS. 11B to 11F are views illustrating the display screen in correspondence with frequency index values (or frequencies) at respective timings in the case where the two single fishes A and B are detected at the different timings. FIGS. 11A to 11F illustrate an example in which the first single fish A is detected at $t=t_1$, the second single fish B is detected at $t=t_m$, the first single fish A goes out of the display screen at $t=t_{n+1}$, and the second single fish B goes out of the display screen at $t=t_p$.

In the first modification, as described above, when the number-of-fish index value of one of the fish body length ranges is 1 or larger but smaller than 2, the number-of-fish index value reducing submodule 17a decrements the number-of-fish index value by double the decrement value. To specifically explain with reference to FIG. 11A, since the frequency index value becomes 1 or larger but smaller than 2 immediately after the single fish B is detected (at $t=t_m$), after $t=t_m$, the frequency index value is decremented by double the decrement value every predetermined time period until the frequency index value becomes smaller than 1.

Operation of Sonar

Figure 12:
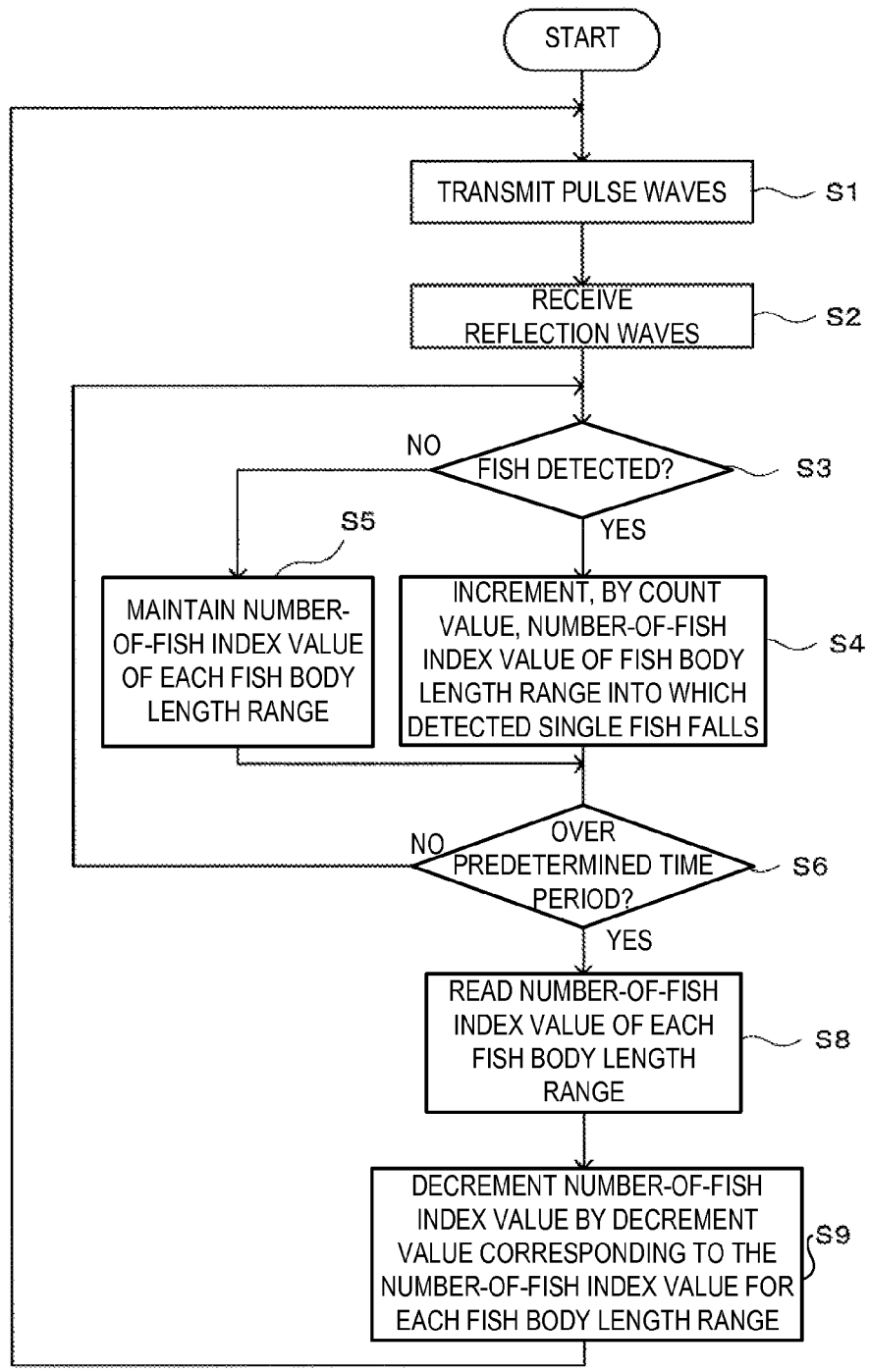
FIG. 12 is a flowchart for describing an operation of the fish finder according to the first modification.

FIG. 12 is a flowchart for describing an operation of the fish finder according to the first modification. Hereinafter, the operation of the fish finder of the first modification is described with reference to FIG. 12. Note that, S1 to S6 of the flowchart in FIG. 12 are similar to those in the above embodiment. To briefly explain, the detection of the single fish is performed with the reception signals generated from the reflection waves of the transmitted pulse waves (S1 to S3), and if the single fish is detected, the count value is added to the number-of-fish index value (S4); whereas if the single fish is not detected, the number-of-fish index value is maintained as it is (S5). S3 to S5 are repeated for the predetermined time period (as long as S6: NO).

After the predetermined time period (S6: YES), at S8, the number-of-fish index value reading submodule 18 reads the number-of-fish index value for each fish body length range in the number-of-fish index value distribution chart stored in the number-of-fish index value distribution chart memory submodule 15. The read number-of-fish index value of each fish body length range is informed to the number-of-fish index value reducing submodule 17a.

At S9, the number-of-fish index value reducing submodule 17a decrements the number-of-fish index value by the value corresponding to this number-of-fish index value to update each number-of-fish index value. Then, the flow returns back to S1 where the transmission and reception of the pulse wave is performed again.

Verification of Validity of Number-of-Fish Index Value Distribution Chart Created in First Modification Hereinafter, similar to the above embodiment, the validity of the number-of-fish index value distribution chart created in the first modification is tested.

Figure 13A:
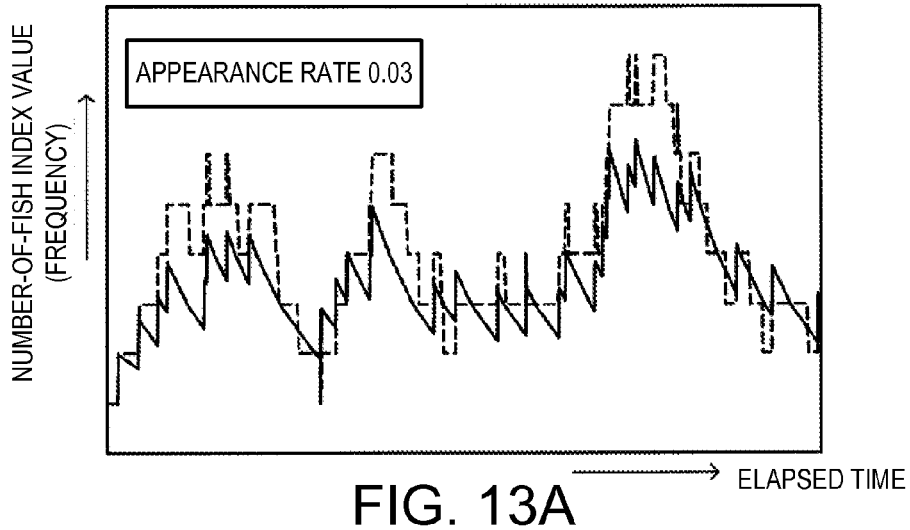
FIGS. 13A to 13C are simulation charts illustrating, with the different appearance rates of single fish, a change of the number-of-fish index value over time in the number-of-fish index value distribution chart created by the fish finder in the first modification together with the change of the frequency (number of single fishes) over time in the frequency distribution chart created by the conventional fish finder.
Figure 13B:
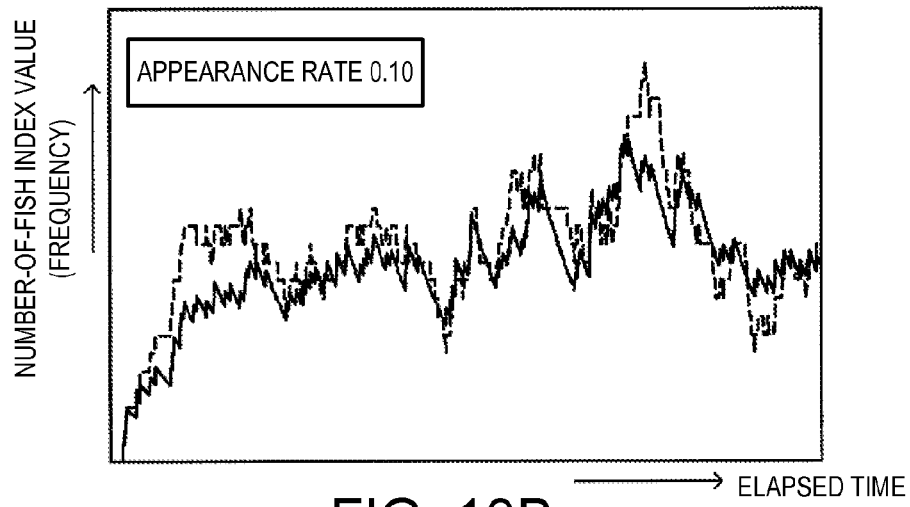
Figure 13C:
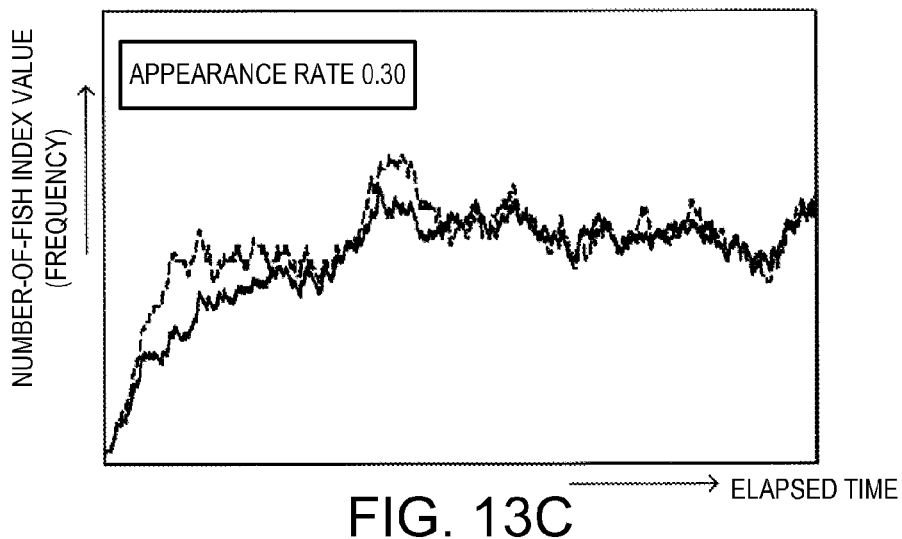

FIGS. 13A to 13C (corresponding to FIGS. 7A to 7C) are simulation charts illustrating a change of the number-of-fish index value over time in the number-of-fish index value distribution chart created by the fish finder in the first modification together with the change of the frequency (number of single fishes) over time in the frequency distribution chart created by the conventional fish finder. As illustrated in FIGS. 13A to 13C, similar to the simulation results in the above embodiment, the change of the number-of-fish index value over time in the number-of-fish index value distribution chart created by the fish finder of the first modification is substantially matching the change of the frequency over time in the frequency distribution chart even if the appearance rate of single fish is changed. Thus, it can be understood that the number-of-fish index value distribution chart created by the fish finder of the first modification is an applicable chart which is similar to the frequency distribution chart.

Figure 14A:
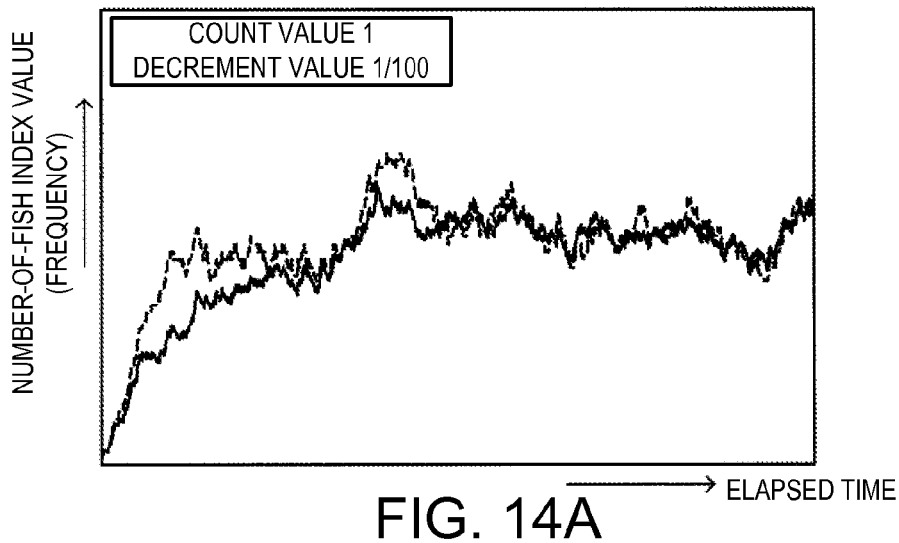
FIGS. 14A to 14C are simulation charts illustrating, with different count values and decrement values, the change of the number-of-fish index value over time in the number-of-fish index value distribution chart created by the fish finder in the first modification together with the change of the frequency (number of single fishes) over time in the frequency distribution chart created by the conventional fish finder.
Figure 14B:
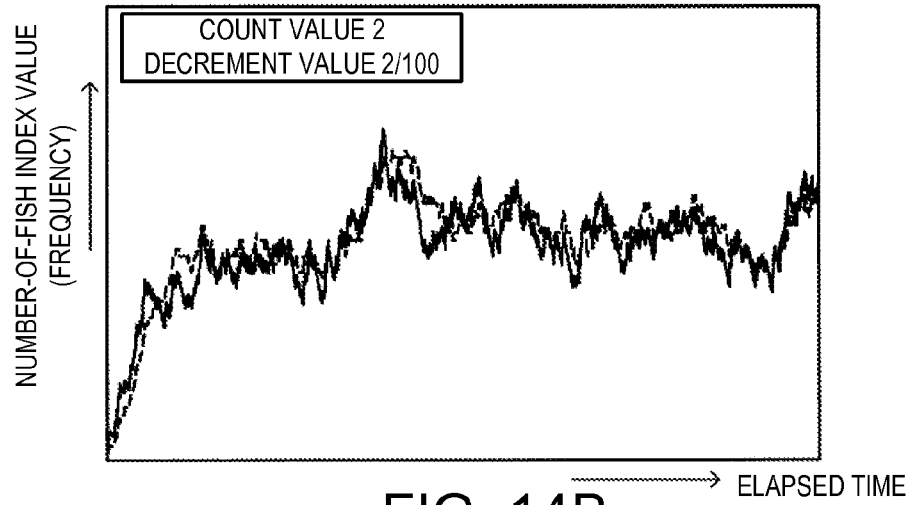
Figure 14C:
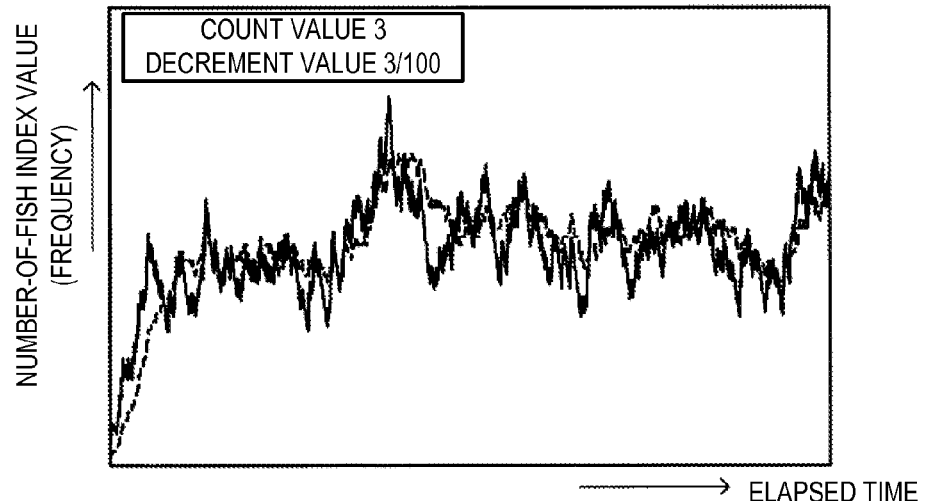

FIGS. 14A to 14C are simulation charts illustrating the change of the number-of-fish index value over time in the number-of-fish index value distribution chart created by the fish finder 1 in the first modification together with the change of the frequency (number of single fishes) over time in the frequency distribution chart created by the conventional fish finder. Specifically, FIG. 14A is the chart where the count value is 1 and the decrement value is 1/100, FIG. 14B is the chart where the count value is 2 and the decrement value is 2/100, and FIG. 14C is the chart where the count value is 3 and the decrement value is 3/100. Moreover, as a condition of the simulations in FIGS. 14A to 14C, as described above, the decrement value is multiplied by a value determined according to the number-of-fish index value of each fish body length range. Specifically, the decrement value is multiplied by 1 when the number-of-fish index value is smaller than 1, the decrement value is multiplied by 2 when the number-of-fish index value is 1 or larger but smaller than 2, and the decrement value is multiplied by 3 when the number-of-fish index value is 2 or larger but smaller than 3.

As illustrated in FIGS. 14A to 14C, the change of the number-of-fish index value over time in the number-of-fish index value distribution chart is substantially matching the change of the frequency over time in the frequency distribution chart even if the count value and the decrement value are changed. Moreover, according to FIGS. 14A to 14C, when the count value and the decrement value are small (see FIG. 14A), although an excessive change of the number-of-fish index value over time can be suppressed, the number-of-fish index value immediately after the number-of-fish index value distribution chart is created tends to be excessively underestimated compared to the actual number of single fishes. On the other hand, when the count value and the decrement value are large (see FIG. 14C), although the tendency of excessive underestimation of the number-of-fish index value immediately after the number-of-fish index value distribution chart is created disappears, the number-of-fish index value excessively changes with time. Based on the simulation results, similarly to the above embodiment, it can be confirmed that a count value and a decrement value are preferably set suitably according to the conditions such as the appearance rate of single fish.

As described above, also with the fish finder of the first modification, the number of the plurality of detected single fishes in each body length range can be estimated without requiring a memory with large capacity, similarly to the case with the fish finder 1 of the above embodiment.

Moreover, with the fish finder of the first modification, the number-of-fish index value reducing submodule 17a decrements, every predetermined time period, the number-of-fish index value of each fish body length range by the value corresponding to the value read by the number-of-fish index value reading submodule 18. Thus, the number-of-fish index value distribution chart D can be updated comparatively easily.

Moreover, with the fish finder of the first modification, a more suitable number-of-fish index value distribution chart D can be created through the control of the user-interface display unit 4 by the operator to suitably set the count value and the decrement value, according to the conditions such as the appearance rate of single fish.

In the above embodiment, the example in which this disclosure is applied to the fish finder as the detecting device is described; however, it is not limited to this. As a second modification, this disclosure may be applied to other kinds of detecting device, such as a sonar.

Figure 15:
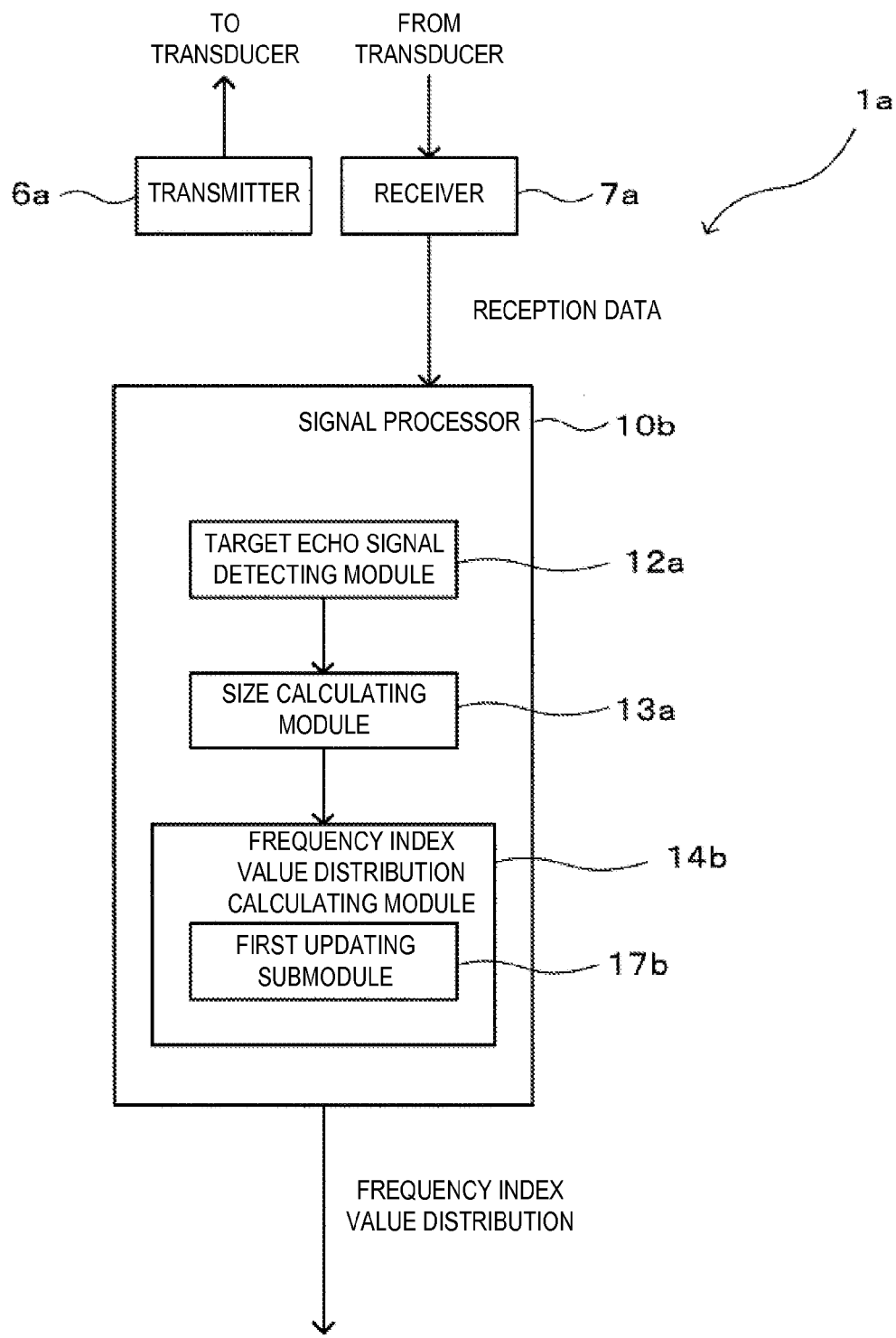
FIG. 15 is a block diagram illustrating a configuration of a detecting device according to a third modification.

FIG. 15 is a block diagram illustrating a configuration of a detecting device 1a according to a third modification. In the above embodiment, the example in which the detecting device uses the ultrasonic wave as the transmission wave is described; however, without limitation to this, it may also be applied to the detecting device 1a using either one of an ultrasonic wave and an electromagnetic wave as the transmission wave. In this case, a transmitter 6a and a receiver 7a of the detecting device 1a of the third modification handle the either one of the ultrasonic wave and the electromagnetic wave. Moreover, a signal processor 10b of the detecting device 1a of the third modification includes a target echo signal detecting module 12a, a size calculating module 13a, and a frequency index value distribution calculating module 14b. The target echo signal detecting module 12a detects target echo signals each caused by one of the target objects which are to be detection targets, among reception signals generated by the receiver 7a. The size calculating module 13a calculates the size (e.g., body length, area and volume) of each of the target objects based on the corresponding target echo signals. Then, a first updating submodule 17b of the frequency index value distribution calculating module 14b updates a frequency index value distribution calculated by the frequency index value distribution calculating module 14b, every predetermined time period. Also with such a configuration, similarly to the above embodiment, the number of the plurality of detected target objects in each size range can be estimated without requiring a memory with large capacity.

In the above embodiment and the above modifications, the count value, the multiplication value, and the decrement value can be changed through the control of the operator; however, it is not limited to this. As a fourth modification, the number-of-fish index value distribution chart may be created based on the count value, the multiplication value, and the decrement value already determined at the time of the product delivery.

In the above embodiment, as illustrated in FIG. 3, the number-of-fish index value of each fish body length range is displayed; however, it is not limited to this. As a fifth modification, a ratio of the frequency index value of each fish body length range with respect to the total of number-of-fish index values may be displayed for each fish body length range by using, for example, percentage (%).

In the above embodiment, the number-of-fish index value distribution chart is created; however, it is not limited to this. As a sixth modification, a number-of-fish index value distribution table formed by summarizing the numbers of single fishes in the respective fish body length ranges as a table may be created and displayed on the display screen.

Figure 16:
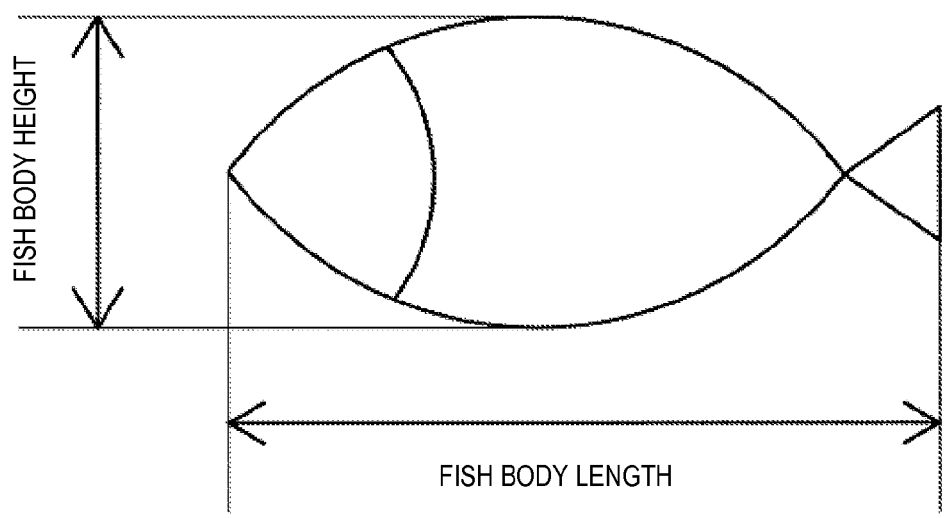
FIG. 16 is a schematic side view of a single fish, for describing a fish body length and a fish body height.

In the above embodiment, the fish body length calculating module 13 is provided as the size calculating module; however, it is not limited to this. As a seventh modification, a fish body height calculating module may be provided as the size calculating module. The fish body height calculating module calculates, for example, a body height (see FIG. 16) based on the length of the fish echo signals detected by the fish echo signal detecting module. Further, with the fish finder of the seventh modification, the number-of-fish index value is calculated for each fish body height range. Furthermore, a fish weight calculating module may be provided as the size calculating module. The fish weight calculating module calculates, for example, the weight of the single fish based on the body length of the single fish. In this case, the number-of-fish index value is calculated for each fish weight range.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A detecting device for detecting target objects, comprising:
    a transmitter configured to transmit a transmission wave at every predetermined timing;
    a receiver configured to generate reception signals from reflection waves of the transmission waves;
    a target echo signal detecting module configured to detect among the reception signals generated by the receiver, target echo signals caused by the target objects;
    a size calculating module configured to calculate a size of each of the target objects based on the corresponding target echo signal; and
    a frequency index value distribution calculating module configured to calculate frequency index values for respective size ranges based on the sizes calculated by the size calculating module, each of the frequency index values being an index of the number of the target objects, the frequency index value distribution calculating module further having a first updating submodule configured to update the frequency index value for each of the size ranges every predetermined time period, wherein
    the first updating submodule reduces the frequency index value for each size range at every predetermined time period.

2. The detecting device of claim 1, wherein the first updating submodule multiplies the frequency index value for each size range, by a predetermined value smaller than 1 every predetermined time period.

3. The detecting device of claim 1, wherein at every predetermined time period, the first updating submodule decrements the frequency index value for each size range, by a value that is a function of the frequency index value.

4. A detecting device for detecting target objects, comprising:
    a transmitter configured to transmit a transmission wave at every predetermined timing;
    a receiver configured to generate reception signals from reflection waves of the transmission waves;
    a target echo signal detecting module configured to detect among the reception signals generated by the receiver, target echo signals caused by the target objects;
    a size calculating module configured to calculate a size of each of the target objects based on the corresponding target echo signal; and
    a frequency index value distribution calculating module configured to calculate frequency index values for respective size ranges based on the sizes calculated by the size calculating module, each of the frequency index values being an index of the number of the target objects, the frequency index value distribution calculating module further having a first updating submodule configured to update the frequency index value for each of the size ranges every predetermined period of time,
    wherein the frequency index value distribution calculating module further has a second updating submodule configured to update, when the target echo signal detecting module detects the target echo signal, the frequency index value of the size range into which the target object corresponding to the target echo signal falls.

5. The detecting device of claim 4, wherein when the target echo signal is detected, the second updating submodule increases the frequency index value of the size range into which the target object corresponding to the target echo signal falls.

6. The detecting device of claim 5, wherein when a plurality of the target echo signals are detected, the second updating submodule increments the frequency index value of the size ranges into which the target objects corresponding to the plurality of the target echo signals fall, by a value determined based on a number of detected target echo signal.

7. The detecting device of claim 1, wherein a period at which the transmission wave is transmitted by the transmitter is the same as a period at which the frequency index value is updated by the first updating submodule.

8. The detecting device of claim 1, wherein the transmitter transmits either one of an ultrasonic wave and an electromagnetic wave as the transmission wave at every predetermined timing.

9. A fish finder configured to detect single fishes, comprising the detecting device of claim 1,
    wherein the transmitter transmits an ultrasonic wave as the transmission wave at every predetermined timing, and
    wherein the size calculating module is provided as a body length calculating module configured to calculate a body length of the single fishes based on the target echo signals corresponding to the single fishes.

10. A method of detecting target objects, comprising:
    transmitting a transmission wave at every predetermined timing;
    generating reception signals from reflection waves of the transmission waves;
    detecting among the generated reception signals target echo signals caused by the target objects;
    calculating a size of each of the target objects based on the corresponding target echo signal; and
    calculating frequency index values for respective size ranges based on the calculated sizes, each of the frequency index values being an index of the number of the target objects,
    wherein calculating the frequency index values for the respective size ranges includes updating to reduce the frequency index value for each of the size ranges every predetermined period of time.

11. The detecting device of claim 1, wherein the first updating submodule applies a decreasing function with time to the frequency index value.

* * * * *